US012705878B2

(12) United States Patent
Kim et al.

(10) Patent No.: US 12,705,878 B2
(45) Date of Patent: Aug. 11, 2026

(54) METHOD AND APPARATUS FOR DETECTING OBJECT IN IMAGE

(71) Applicant: SAMSUNG ELECTRONICS CO., LTD., Suwon-si (KR)

(72) Inventors: Kikyung Kim, Hwaseong-si (KR); Insoo Kim, Seongnam-si (KR); Jiwon Baek, Hwaseong-si (KR); Seungju Han, Seoul (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 840 days.

(21) Appl. No.: 17/698,445

(22) Filed: Mar. 18, 2022

(65) Prior Publication Data

US 2023/0038006 A1 Feb. 9, 2023

(30) Foreign Application Priority Data

Aug. 4, 2021 (KR) ........................ 10-2021-0102431

(51) Int. Cl.
*G06V 10/98* (2022.01)
*G06V 10/44* (2022.01)
*G06V 10/82* (2022.01)

(52) U.S. Cl.
CPC .............. *G06V 10/98* (2022.01); *G06V 10/44* (2022.01); *G06V 10/82* (2022.01)

(58) Field of Classification Search
CPC ........ G06V 10/98; G06V 10/44; G06V 10/82; G06V 10/764; G06V 10/759; G06V 10/80; G06V 10/25; G06V 10/454; G06V 10/809; G06T 7/136; G06T 7/11; G06T 5/50; G06T 7/174; G06T 2207/20084; G06N 3/02
See application file for complete search history.

(56) References Cited

U.S. PATENT DOCUMENTS

| | | | |
|---|---|---|---|
| 6,563,950 | B1 | 5/2003 | Wiskott et al. |
| 7,646,909 | B2 | 1/2010 | Jiang et al. |
| 8,121,357 | B2 | 2/2012 | Imaoka |

(Continued)

FOREIGN PATENT DOCUMENTS

| | | | | |
|---|---|---|---|---|
| CN | 112785565 A | * | 5/2021 | ............. G06F 18/24 |
| JP | 2020-35338 A | | 3/2020 | |

(Continued)

OTHER PUBLICATIONS

Roth, Peter, et al. "Object Detection with Bootstrapped Learning." *Proc. 10th Computer Vison Winterworkshop* (2005): (10 pages in English).

(Continued)

*Primary Examiner* — Ming Y Hon
*Assistant Examiner* — Dominique James
(74) *Attorney, Agent, or Firm* — NSIP Law

(57) ABSTRACT

An object detection method performed by an object detection apparatus, includes receiving an input image, obtaining, using an object detection model, a result of detecting a target candidate object from the input image, obtaining, using an error prediction model, a result of detecting an error object from the input image, and detecting a target object in the input image based on the result of detecting the target candidate object and the result of detecting the error object.

14 Claims, 14 Drawing Sheets

(56) References Cited

U.S. PATENT DOCUMENTS

| | | | | |
|---|---|---|---|---|
| 8,571,332 | B2 | 10/2013 | Kumar et al. | |
| 8,856,541 | B1 | 10/2014 | Chaudhury et al. | |
| 10,657,364 | B2 * | 5/2020 | El-Khamy | G06F 18/2415 |
| 2012/0288167 | A1 * | 11/2012 | Sun | G06V 40/16 382/118 |
| 2013/0322705 | A1 | 12/2013 | Wong | |
| 2014/0044359 | A1 | 2/2014 | Rousson | |
| 2014/0169643 | A1 | 6/2014 | Todoroki | |
| 2014/0198953 | A1 * | 7/2014 | Tanaka | G06V 40/10 382/103 |
| 2015/0125049 | A1 | 5/2015 | Taigman et al. | |
| 2018/0089505 | A1 | 3/2018 | El-Khamy et al. | |
| 2019/0147610 | A1 * | 5/2019 | Frossard | G06N 3/045 382/103 |
| 2019/0213438 | A1 * | 7/2019 | Jones | G06V 20/10 |
| 2020/0380671 | A1 | 12/2020 | Zuo et al. | |
| 2021/0012205 | A1 | 1/2021 | Ozaki | |
| 2022/0415055 | A1 * | 12/2022 | Liu | G06V 10/26 |

FOREIGN PATENT DOCUMENTS

| | | | |
|---|---|---|---|
| JP | 2021-72592 | A | 5/2021 |
| KR | 10-2016-0092441 | A | 8/2016 |
| KR | 10-2017-0022625 | A | 3/2017 |
| KR | 10-1793510 | B1 | 11/2017 |
| KR | 10-2020-0094844 | A | 8/2020 |
| KR | 10-2021-0024871 | A | 3/2021 |

OTHER PUBLICATIONS

Shrivastava, Abhinav, Abhinav Gupta, and Ross Girshick. "Training region-based object detectors with online hard example mining." *Proceedings of the IEEE conference on computer vision and pattern recognition*. 2016. pp. 761-769 (9 pages in English).

Extended European Search Report Issued on Dec. 7, 2022, in counterpart European Patent Application No. 22186436.6 (11 Pages in English).

* cited by examiner

METHOD AND APPARATUS FOR DETECTING OBJECT IN IMAGE

CROSS-REFERENCE TO RELATED APPLICATIONS

This application claims the benefit under 35 USC § 119(a) of Korean Patent Application No. 10-2021-0102431, filed on Aug. 4, 2021, in the Korean Intellectual Property Office, the entire disclosure of which is incorporated herein by reference for all purposes.

BACKGROUND

1. Field

The following description relates to a technology for detecting an object in an image.

2. Description of Related Art

Electronic apparatuses, including an image acquisition device (e.g., a camera), are widely used. Developments in communication technology and data processing technology greatly increase the number of images generated by the electronic apparatuses. Image-related technologies such as object detection technologies have also been continuously developing. An object detection technology may be a technology for detecting an object in an image or a computer technology associated with computer vision and image processing. When an object is being detected, a function of detecting a series of semantic object instances (e.g., humans, buildings, cars, etc.) may be performed using digital images and videos. Such object detection may be applied in fields of computer vision (e.g., image restoration, video surveillance, security systems, identity verification, user searches, etc.), and due to rapid developments in deep learning technologies, more research is being conducted on object detection technologies for accurately detecting a desired object in an image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an object detection method performed by an object detection apparatus, the method includes receiving an input image; obtaining, using an object detection model, a result of detecting a target candidate object from the input image; obtaining, using an error prediction model, a result of detecting an error object from the input image; and detecting a target object in the input image based on the result of detecting the target candidate object and the result of detecting the error object.

The result of detecting the target candidate object may include an object score corresponding to a target region of the target candidate object detected in the input image and the target candidate object. The result of detecting the error object may include an error region of the error object detected in the input image.

The detecting of the target object may include determining a final score of the target candidate object by applying, to the object score, a weight determined based on a degree of overlap between the target region of the target candidate object and the error region of the error object, and detecting the target object in the input image based on the final score.

The detecting of the target object may include determining the target candidate object as the target object in response to the final score for the target candidate object being equal to or greater than a threshold.

The object detection model may provide the result of detecting the target candidate object based on feature data extracted from the input image. The error prediction model may provide the result of detecting the error object based on another feature data extracted from the input image.

The object detection model may provide the result of detecting the target candidate object based on feature data extracted from the input image. The error prediction model may provide the result of detecting the error object based on the feature data extracted from the input image. The object detection model and the error prediction model may share feature extraction layers that extract the feature data from the input image.

The object detection model and the error prediction model may each based on a separate neural network.

The object detection may further include obtaining an additional result of detecting the target candidate object from the input image using an error compensation model. The additional result may include an error compensation target region of the target candidate object detected using the error compensation model.

The detecting of the target object may include determining a final score of the target candidate object by applying, to the object score, a first weight determined based on a degree of overlap between the target region of the target candidate object detected using the object detection model and the error region of the error object and a second weight determined based on a degree of overlap between the target region of the target candidate object using the object detection model and the error compensation target region of the target candidate object detected using the error compensation model, and detecting the target object in the input image based on the final score.

The error prediction model may output the result of detecting the error object and an additional result of the target candidate object. The detecting of the target object may include detecting the target object in the input image based on the result of detecting the target candidate object, the result of detecting the error object, and the additional result of detecting the target candidate object.

The result of detecting the target candidate object may include the result of detecting the target candidate object for a plurality of object classes. The plurality of object classes may include a person and a capturing apparatus.

A non-transitory computer-readable storage medium may store instructions that, when executed by one or more processors, cause the one or more processors to perform the method above.

In another general aspect, an object detection apparatus includes one or more processors are configured to receive an input image, obtain a result of detecting a target candidate object from the input image using an object detection model, obtain a result of detecting an error object from the input image using an error prediction model, and detect a target object in the input image based on the result of detecting the target candidate object and the result of detecting the error object.

The result of detecting the target candidate object may include an object score corresponding to a target region of the target candidate object detected in the input image and the target candidate object. The result of detecting the error object may include an error region of the error object detected in the input image.

The one or more processors may be further configured to determine a final score of the target candidate object by applying, to the object score, a weight determined based on a degree of overlap between the target region of the target candidate object and the error region of the error object; and detect the target object in the input image based on the final score.

The one or more processors may be further configured to obtain an additional result of detecting the target candidate object from the input image using an error compensation model. The additional result of detecting the target candidate object may include an error compensation target region of the target candidate object detected using the error compensation model.

The one or more processors may be further configured to determine a final score of the target candidate object by applying, to the object score, a first weight determined based on a degree of overlap between the target region of the target candidate object detected using the object detection model and the error region of the error object and a second weight determined based on a degree of overlap between the target region of the target candidate object using the object detection model and the error compensation target region of the target candidate object detected using the error compensation model; and detect the target object in the input image based on the final score.

In another general aspect, an image monitoring apparatus includes a communication apparatus configured to receive an image from one or more terminals, and one or more processors. The one or more processors are configured to obtain a result of detecting a target candidate object from the image using an object detection model, obtain a result of detecting an error object from the image using an error prediction model, detect a target object from the input image based on the result of detecting the target candidate object and the result of detecting the error object, and execute an operation corresponding to a preset target object in response to the preset target object being detected as the result of detecting the target object.

The result of detecting the target candidate object may include an object score corresponding to a target region of the target candidate object detected in the input image and the target candidate object. The result of detecting the error object may include an error region of the error object detected in the input image. The one or more processors may be further configured to determine a final score of the target candidate object by applying, to the object score, a weight determined based on a degree of overlap between the target region of the target candidate object and the error region of the error object; and detect the target object in the input image based on the final score.

In another general aspect, an object detection apparatus includes one or more processors are configured to receive an input image, extract feature data from the input image using a feature extractor, detect a first target candidate object from the feature data using an object detection model, detect an error object from the feature data using an error prediction model, detect a second target candidate object from the feature data using an error compensation model, and detect a target object in the input image based on the first target candidate object, the error object, and the second target candidate object.

The object detection apparatus may further include a memory configured to store instructions; wherein the one or more processors are further configured to execute the instructions to configure the one or more processors to receive the input image, extract the feature data from the input image using the feature extractor, detect the first target candidate object from the feature data using the object detection model, detect the error object from the feature data using the error prediction model, detect the second target candidate object from the feature data using the error compensation model, and detect the target object in the input image based on the first target candidate object, the error object, and the second target candidate object.

The feature extractor may include a plurality of feature extractors. A first feature extractor of the feature extractors may provide the feature data of the first target candidate object, a second feature extractor of the feature extractors may provide the feature data of the error object, a third feature extractor of the feature extractors may provide the feature data of the second target candidate object, and the feature extractors are different from each other.

Other features and aspects will be apparent from the following detailed description, the drawings, and the claims.

Figure 1:
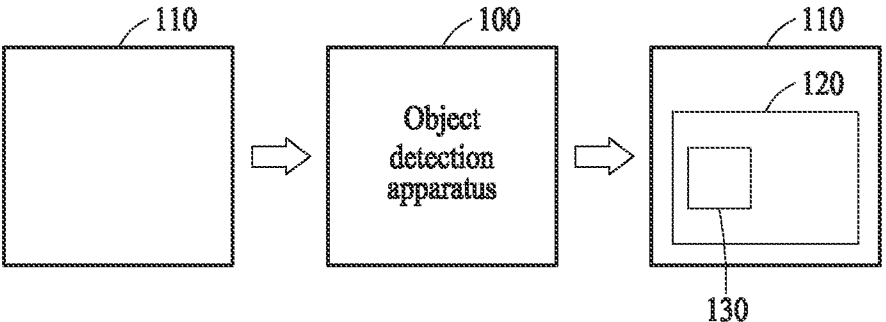
FIG. 1 illustrates an example of an overview of an object detection apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of an overview of an object detection apparatus.

Referring to FIG. 1, an object detection apparatus 100 may detect an object in an input image 110. The input image 110 may be a still image, a moving image, or a video, and may correspond to a color image, a black and white image, a gray image, an infrared image, or a depth image. The terms "input image" and "image" used herein may be used interchangeably, and "object" used herein may refer to a target such as a person or an object to be detected in an input image. A type of object to be detected may be defined in advance as a preset type (e.g., a person, a capturing apparatus) or may remain undefined.

The object detection apparatus 100 may be applied in various fields. For example, the object detection apparatus 100 may analyze an image received from a terminal of a worker in a teleworking environment to detect a person, a pose or a movement of a person, and a presence of an object (e.g., a capturing device, a mobile device) in the image. In addition, the object detection apparatus 100 may be used, for example, in or for a surveillance system (e.g., closed-circuit television (CCTV) surveillance, or military border surveillance system), a sports game analysis, a smart campus, a video conferencing system, and the like. The object detection apparatus 100 may be used in other fields when there is a need to detect an object in an image.

An object detection process is described hereinafter. The input image 110, which includes a target object to be detected, may be input to the object detection apparatus 100. In an example, image preprocessing may be performed on the input image 110 before the input image 110 is input to the object detection apparatus 100. The image preprocessing may include one or more processes of converting the input image 110 into a more suitable form for detecting an object. For example, the image preprocessing may include adjusting a size/resolution of the input image 110, rotating the input image 110, removing noise, adjusting contrast, correcting distortion, deblurring, cropping, and the like. When the image preprocessing is performed, the input image 110 on which the image preprocessing is performed may be input to the object detection apparatus 100.

The object detection apparatus 100 may detect the object from the input image 110 using an object detection model based on a neural network. The object detection model may be trained in advance based on training data, and when the object is being detected, the object detection model may provide a function of discriminating (or detecting) objects very precisely through non-linear mapping. In an example, the object detection model may be based on a deep convolutional neural network (DCNN). The DCNN may include a convolution layer, a pooling layer, and a fully connected layer, and a result of detecting the object may be provided from the input image 110 that is input to the object detection model. Here, the DCNN is provided as merely an example, and the object detection model may be based on a neural network having a structure other than the DCNN. The neural network is further described with reference to FIG. 12.

In addition to the object detection model, the object detection apparatus 100 may determine the result of detecting the object using an error prediction model. The error prediction model may predict an error in object detection and provide error prediction information that is different from an output of the object detection model. When the error prediction model is being trained, the error prediction model may be trained to perform a function of detecting an error that the object detection model may cause and supplement the error of the object detection model. Thus, object detection accuracy may be improved by reducing errors in the object detection result through the error prediction model. An object detection process using an object detection model and an error prediction model, and a training process of the object detection model and the error prediction model are further described in detail below.

In an example, the result of detecting the object in the input image 110 may be a region including the object, which is represented by a bounding box. Bounding boxes may overlap with each other, and one bounding box may be included in another bounding box. The object detection apparatus 100 may provide the object detection result, including a position (e.g., a reference position such as a center position or a corner position, etc.), a size (e.g., a width and a height) of the bounding box, an object class, and the like. The bounding box may be formed in any shape (e.g., a rectangle or a square), and at least a portion of a line of the bounding box may be in contact with a portion of a region of the object or be spaced from a boundary of the region of the object by a preset distance. The object (e.g., a person, a capturing device, etc.) to be detected corresponding to one or more of classes may appear as bounding boxes 120 and 130 in the input image 110.

Figure 2:
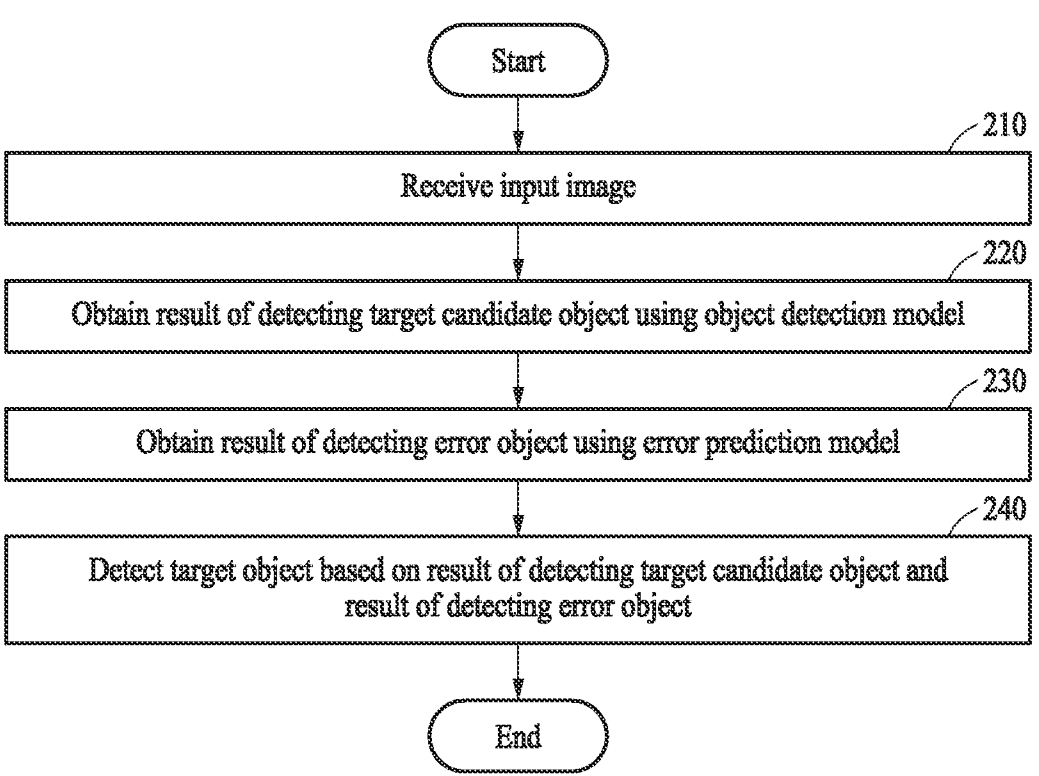
FIG. 2 illustrates an example of operations of an object detection method.

FIG. 2 illustrates an example of operations of an object detection method. Operations of the object detection method may be performed by the object detection apparatus 100 illustrated in FIG. 1 or the object detection apparatus 1200 illustrated in FIG. 12.

Referring to FIG. 2, in operation 210, an object detection apparatus may receive an input image as a target for object detection.

In operation 220, the object detection apparatus may obtain a result of detecting a target candidate object from the input image using an object detection model. The object detection model may provide the result of detecting the target candidate object based on feature data (e.g., a feature map) extracted from the input image. The object detection model may be based on a neural network trained to provide the result of detecting the target candidate object. The target candidate object may represent an object with a potential to be a target object, the target object being a target when the object is being detected. While the purpose of the target candidate object is to include the target object, in some cases, an undesired error object may be included as a target candidate object.

The result of detecting the target candidate object provided by the object detection model may include information associated with a region of the target candidate object detected in the input image and an object score corresponding to the target candidate object. The region of the target candidate object may be represented, for example, by a square-shaped bounding box, and the object detection model may output information associated with a reference position (e.g., a center position or any one of a corner position) and a size (e.g., a width and a height) of the bounding box. Information associated with the object score may represent a probability or an expected value of the target candidate object, including an object. In an example, the object detection model may provide the result of detecting the target candidate object for a plurality of object classes by classifying the object classes. The object classes may include, for example, a person and a capturing device. In this case, the object detection model may provide a type of an object class corresponding to the target candidate object and the probability or the expected value of the target candidate object corresponding to the object class. For example, the object detection model may operate based on a you only look once (YOLO) algorithm for object detection.

In operation 230, the object detection apparatus may obtain a result of detecting an error object from the input image using an error prediction model. The error prediction model may provide the result of detecting the error object based on feature data (e.g., a feature map) extracted from the input image. The error prediction model may be based on a neural network trained to provide the result of detecting the error object and predict an object that may be incorrectly detected. When an object is being detected, an error object may not be an expected target, but may be incorrectly designated as a target candidate object by the object detection model. Thus, to improve object detection accuracy, the error object may need to be selected appropriately from among target candidate objects. The object detection apparatus may use the error prediction model and the object detection model to improve the object detection accuracy by reducing a possibility of an error object being included in a final object detection result. It may be determined whether an object is unexpected or not through a detection result of the error prediction model, and thereby false positives may be reduced.

The result of detecting the error object provided by the error prediction model may include information associated with a region of an error object detected in the input image. The region of the error object may be represented, for example, by a square-shaped bounding box, and the error prediction model may output information associated with a reference position (e.g., a center position or any one of a corner position) and a size (e.g., a width and a height) of the bounding box. In an example, the error prediction model may not detect any error objects in the input image or detect one or a plurality of error objects.

An object detection structure including the object detection model and the error prediction model may be implemented in various forms. In an example, the object detection model and the error prediction model may share feature extraction layers that extract feature data from the input image. The feature extraction layers may extract a feature map from the input image, and the extracted feature map may be input to the object detection model and the error prediction model. In another example, the object detection model and the error prediction model may be based on a separate neural network. In such a case, the object detection model and the error prediction model may be present independently, and each model may have separate feature extraction layers for extracting the feature map from the input image.

Operations 220 and 230 may be performed sequentially or in parallel. When the operations 220 and 230 are performed sequentially, operation 220 may be performed before operation 230, or operation 230 may be performed before operation 220.

In operation 240, the object detection apparatus may detect the target object from the input image based on the result of detecting the target candidate object and the result of detecting the error object. The object detection apparatus may select the target object by combining the detection result using the object detection model and the detection result using the error prediction model. The target object may represent an object selected as the final result of detecting the object. The object detection apparatus may determine a weight based on a degree of overlap between the region of the target candidate object and the region of the error object. When the weight is being determined, an intersection over union (IOU) function using a value obtained by dividing an area of a region of intersection between two regions by a value of a sum region may be used. A ratio of an overlap region between the region of the target candidate object and the region of the error object in a total area that combines the region of the target candidate object and the error object may be calculated through the IOU function, and a weight may be determined based on the ratio. The weight determined using the IOU function is described with reference to FIG. 4.

The object detection apparatus may determine a final score of the target candidate object by applying the determined weight to the object score of the target candidate object and detecting the target object from the input image based on the determined final score. For example, when the final score of the target candidate object is equal to or greater than a threshold, the object detection apparatus may determine the target candidate object as the target object, and when the final score is less than the threshold, the target candidate object may not be selected as the target object.

The object detection apparatus may improve the accuracy of an object detection result by reducing predicted errors using the error prediction model, and at the same time, maintaining its unique detection performance. While the object detection model continues to detect objects that are already well-detected by the object detection model, performance for detecting the object may be improved by separately detecting and reflecting the objects that the object detection model incorrectly detects through the error prediction model in the final object detection result.

Figure 3:
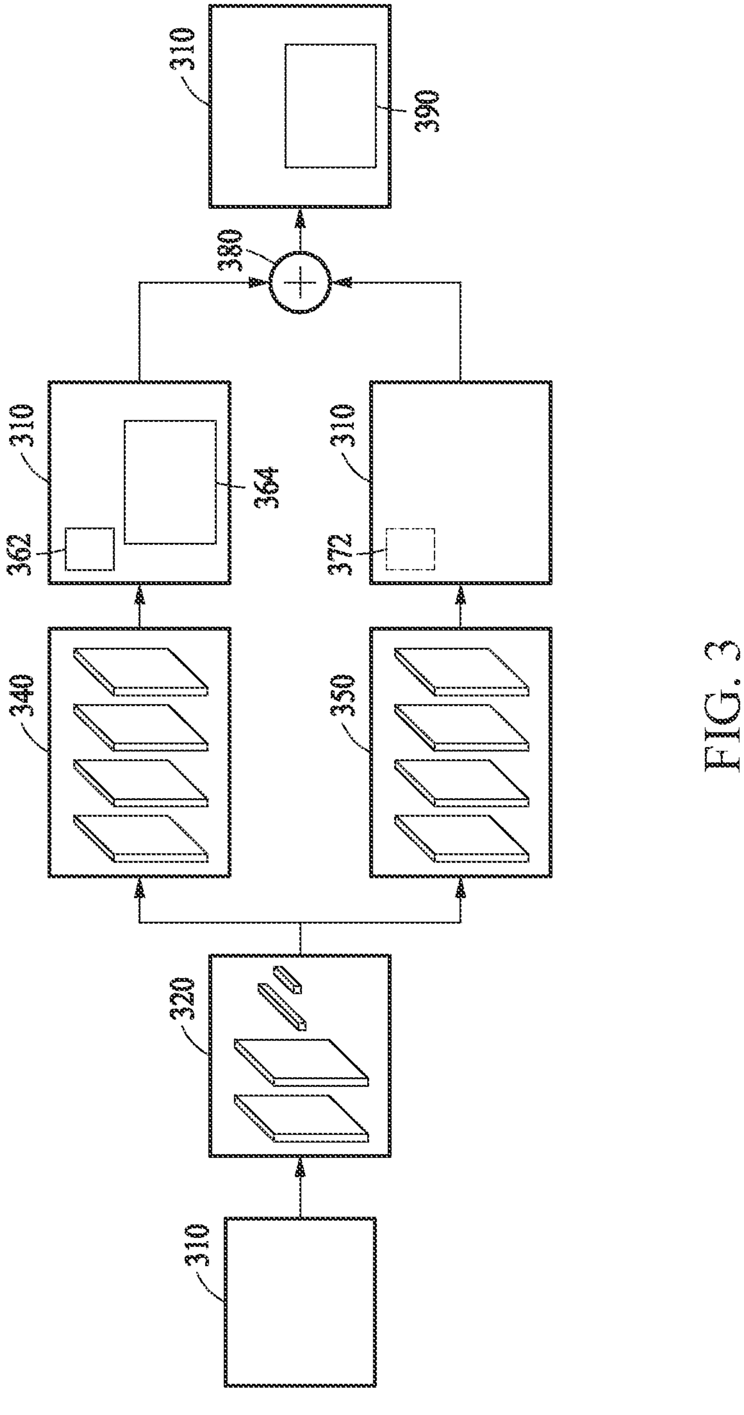
FIG. 3 illustrates an example of a structure for detecting a first object.

FIG. 3 illustrates an example of a structure for detecting a first object.

Referring to FIG. 3, an input image 310 may be input to a feature extractor 320. The feature extractor 320 may include, for example, layers of a convolutional neural network (CNN) as feature extraction layers. The feature extractor 320 may also be referred to as a backbone network. A feature map may be output as feature data corresponding to the input image 310 from the feature extractor 320, and the feature map may be transmitted to an object detection model 340 and an error prediction model 350. Thus, the object detection model 340 and the error prediction model 350 may share the feature extraction layers that extract the feature data from the input image 310, and thus object detection performance may be improved while a computation speed is not reduced through the sharing of such feature extraction layers. The object detection model 340 and the error prediction model 350 may share a part or all of the feature extractor 320.

Target candidate objects 362 and 364 may be detected from the input image 310 through the object detection model 340, and an error object 372 may be detected from the input image 310 through the error prediction model 350. Output values of the object detection model 340 may be represented as vector values, including reference positions of a region corresponding to each of the target candidate objects 362 and 364, sizes of each region, and information associated with object classes. An output value of the error prediction model 350 may be represented as a vector value including information associated with a reference position and a size of a region corresponding to the error object 372.

The object detection apparatus may detect a target object 390 from the input image 310 by a fusion 380 (or a combination) of results of detecting the target candidate objects 362 and 364 and the result of detecting the error object 372. A result value from the fusion 380 may be represented as a vector value including a reference position of the region and a size of the region corresponding to the target object 390, and information associated with an object class. An error included in the results of detecting the target candidate objects 362 and 364 may be supplemented through the fusion 380. In the fusion 380 process, the object detection apparatus may process a region of a target candidate object 362 that overlaps a region of an error object 372 predicted by the error prediction model 350 to have a high error probability, and thus the target candidate object 362 may not be reflected in the result of detecting the target object 390.

In the fusion 380 process, the object detection apparatus may apply, to each of the target candidate objects 362 and 364, a weight determined based on a degree of overlap between regions of the target candidate objects 362 and 364 and the region of the error object 372 and determine the final score. For example, the final score may be calculated as expressed by Equation 1 below.

$$S_{fin}=S_{org}-\lambda\times\max(\mathrm{IOU}(b_{org},b_{epm})) \quad (1)$$

In Equation 1, $S_{fin}$ denotes a final score of a target candidate object, and $S_{org}$ denotes an object score of the target candidate object determined by the object detection model 340. $\lambda$ denotes a constant, and $b_{org}$ and $b_{epm}$ denote a bounding box for the target candidate object and a bounding box for an error object, respectively. IOU( ) denotes an IOU function. A weight based on a degree of overlap between the bounding box of the target candidate objects and the bounding box of the error object may be determined by the IOU function, and a final score $S_{fin}$ may be determined by subtracting a value in which the greatest weight among weights corresponding to bounding boxes for each error object is multiplied to a preset constant $\lambda$ from the object score $S_{org}$. As described above, the object detection apparatus may determine the final score by adjusting the object score of each target candidate object based on a degree of overlap of the bounding box of the error object, and when the final score is equal to or greater than a threshold, the target object may be determined. When the final score of the target candidate object is less than the threshold, the target candidate object may be excluded from being the target object.

Figure 4:
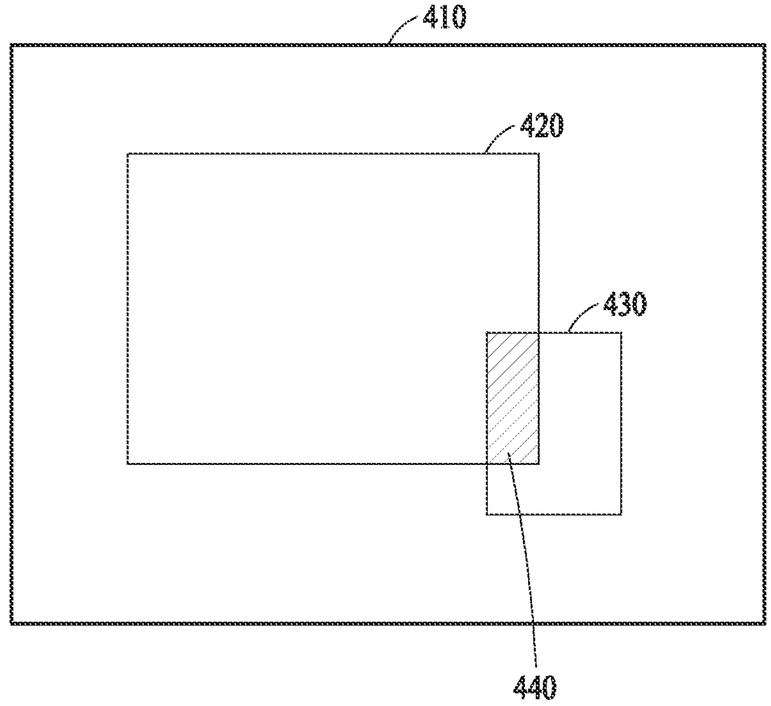
FIG. 4 illustrates an example of determining a weight based on a degree of overlap between regions.

FIG. 4 illustrates an example of determining a weight based on a degree of overlap between regions.

Referring to FIG. 4, a region of a target candidate object 420 and a region of an error object 430 may be shaped in a form of a bounding box in the input image 410, and the region of the target candidate object 420 and the region of the error object 430 may have an overlap region 440. An object detection apparatus may determine a weight based on a degree of overlap between the region of the target candidate object 420 and the region of the error object 430 using the IOU function. A value of the IOU function may be the degree of overlap between the region of the target candidate object 420 and the region of the error object 430 and represent a value obtained by dividing an area of the overlap region 440 by an area of the union region that combines both regions. The value of the IOU function may range from 0 to 1. A value of 0 may represent that the region of the target candidate object 420 and the region of the error object 430 do not overlap at all, and a value of 1 may represent that the region of the target candidate object 420 and the region of the error object 430 completely overlap. When a ratio of the overlap region 440 increases compared to the union region of the two regions, the value of the IOU function may become closer to 1, and a weight may increase. Based on Equation 1, as the weight gradually increases, a final score for the target candidate object 420 may decrease.

Figure 5:
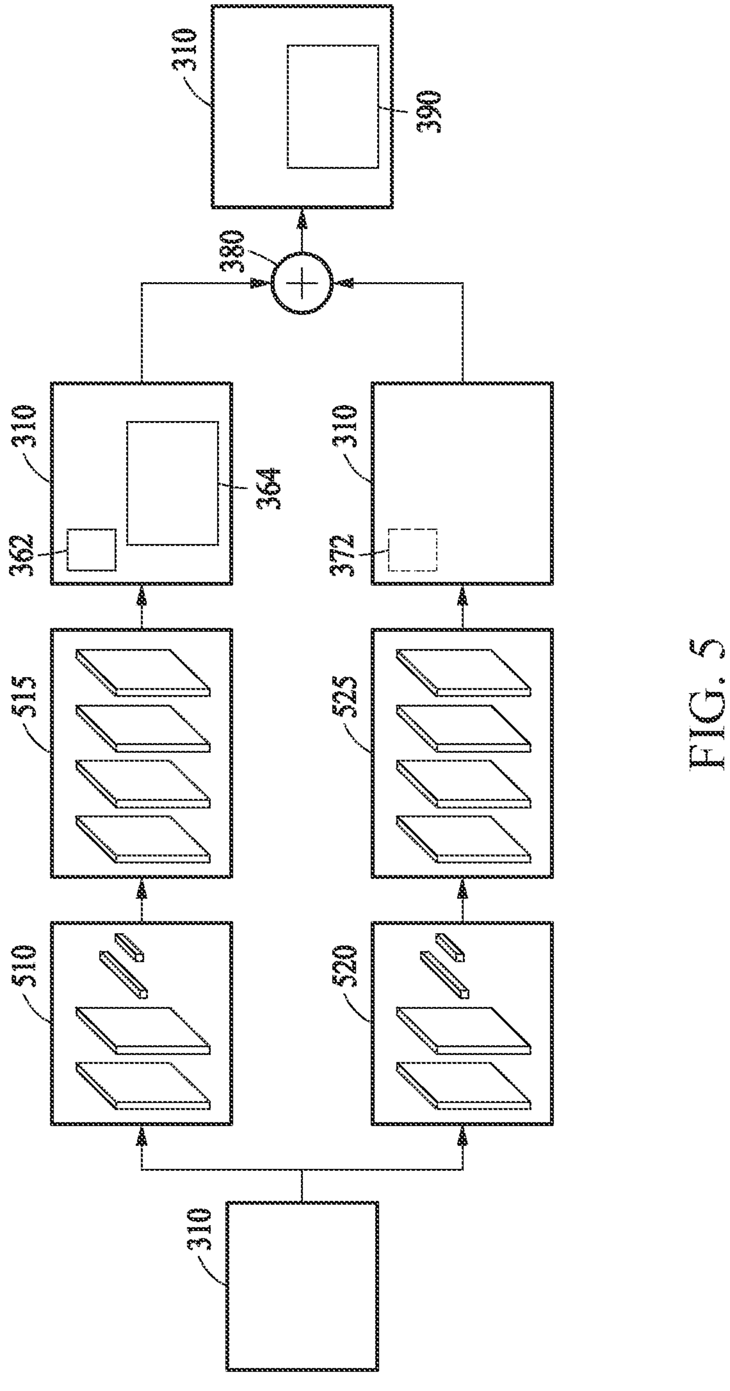
FIG. 5 illustrates an example of a structure for detecting a second object.

FIG. 5 illustrates an example of a structure for detecting a second object.

Referring to FIG. 5, a structure for detecting a second object may be partially modified from the structure for detecting the first object illustrated in FIG. 3. The structure for detecting the first object may be configured such that the object detection model 340 and the error prediction model 350 share all or a part of the feature extractor 320. In contrast, an object detection model 515 and an error prediction model 525 may be based on a separate neural network in the structure for detecting the second object. Thus, the object detection model 515 and the error prediction model 525 may have separate feature extractors 510 and 520, respectively. A feature extractor 510 may extract feature data (e.g., a feature map) from the input image 310 and transmit the feature data to the object detection model 515, and a feature extractor 520 may extract feature data from the input image 310 and transmit the feature data to the error prediction model 525. Structures or features of the feature extractor 510 and the feature extractor 520 may be the same or different from each other. The feature extractor 520 may independently extract feature data for detecting the error object 372 than the object detection model 515, and thus the structure for detecting the second object may have a greater possibility of extracting the error object 372 more accurately than the structure for detecting the first object. In an example, the feature extractor 510 may be integrated into the object detection model 515, and the feature extractor 520 may be integrated into the error prediction model 525. The target candidate objects 362 and 364 in the input image 310 may be detected through the object detection model 515, and the error object 372 may be detected from the input image 310 through the error prediction model 525. Other processes described hereinafter may be the same as those described with reference to FIG. 3. Thus, a more detailed description of the operations is not included here, for brevity.

Figure 6:
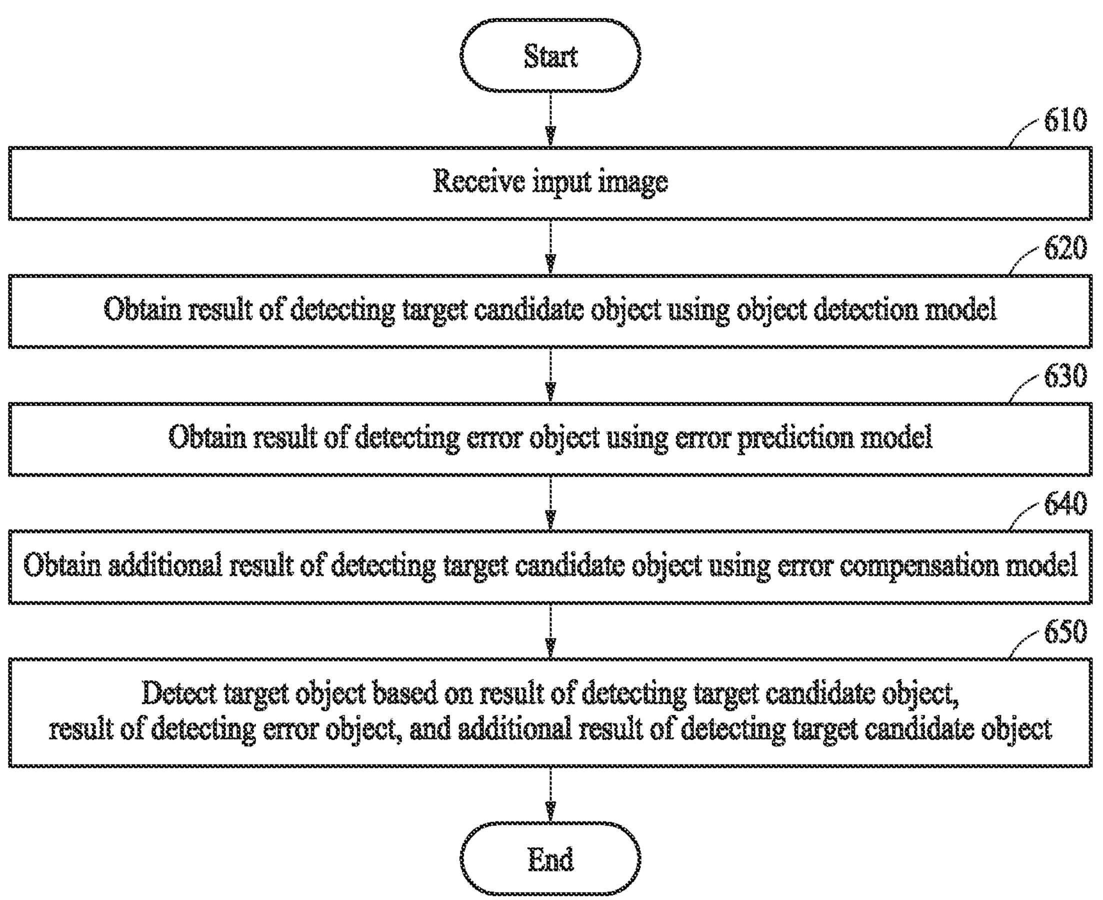
FIG. 6 illustrates an example of operations of an object detection method.

FIG. 6 illustrates an example of operations of an object detection method. Operations of the object detection method may be performed by the object detection apparatus 100 illustrated in FIG. 1 or the object detection apparatus 1200 illustrated in FIG. 12.

Referring to FIG. 6, in operation 610, an object detection apparatus may receive an input image as a target for object detection. In operation 620, the object detection apparatus may obtain a result of detecting a target candidate object from the input image using an object detection model. In operation 630, the object detection apparatus may obtain a result of detecting an error object from the input image using an error prediction model. Operations 610 through 630 may correspond to operations 210 through 230 illustrated in FIG. 2. Thus, a more detailed description of the operations is not included here, for brevity.

In operation 640, the object detection apparatus may obtain an additional result of detecting the target candidate object from the input image using an error compensation model. The error compensation model may be based on a neural network trained to detect the target candidate object based on feature data (e.g., a feature map) extracted from the input image. The error compensation model may be trained to detect the target candidate object with a reference value greater than that of the object detection model. For example, when a probability of an object being detected by the object detection model in operation 620 is to be greater than 50%, the object detection model may select the object as the target candidate object, and when a probability of an object being detected by the error compensation model is to be greater than 70%, the error compensation model may select the object as the target candidate object.

The additional result of detecting the target candidate object obtained by the error compensation model may include a region of the target candidate object detected using the error compensation model. The region of the target candidate object may be represented as a bounding box, and the error compensation model may output information associated with a reference position (e.g., a center position or any one of a corner position) and a size (e.g., a width and a height) of the bounding box. In an example, the error compensation model may not detect any target candidate objects in the input image or detect one or a plurality of target candidate objects in the input image. The object detection apparatus may additionally use the error compensation model to reduce false negatives from occurring, and thus improve object detection accuracy.

Operations 620 through 640 may be performed sequentially or in parallel. When the operations 620 through 640 are performed sequentially, they may be performed in an undetermined order.

In operation 650, the object detection apparatus may detect the target object based on the result of detecting the target candidate object in operation 620, the result of detecting the error object in operation 630, and the additional result of detecting the target candidate object in operation 640. The object detection apparatus may determine a first weight based on a degree of overlap between the region of the target candidate object detected using the object detection model and the region of the error object and a second weight based on a degree of overlap between the region of the target candidate object detected using the object detection model and the region of the target candidate object detected using the error compensation model. The object detection apparatus may determine the final score of the target candidate object by applying the determined first weight and second weight to the object score of the target candidate object and detect the target object from the input image based on the determined final score. For example, when the final score of the target candidate object is equal to or greater than a threshold, the object detection apparatus may determine the target candidate object as the target object, and when the final score is less than the threshold, the object detection apparatus may not determine the target candidate object as the target object.

Figure 7:
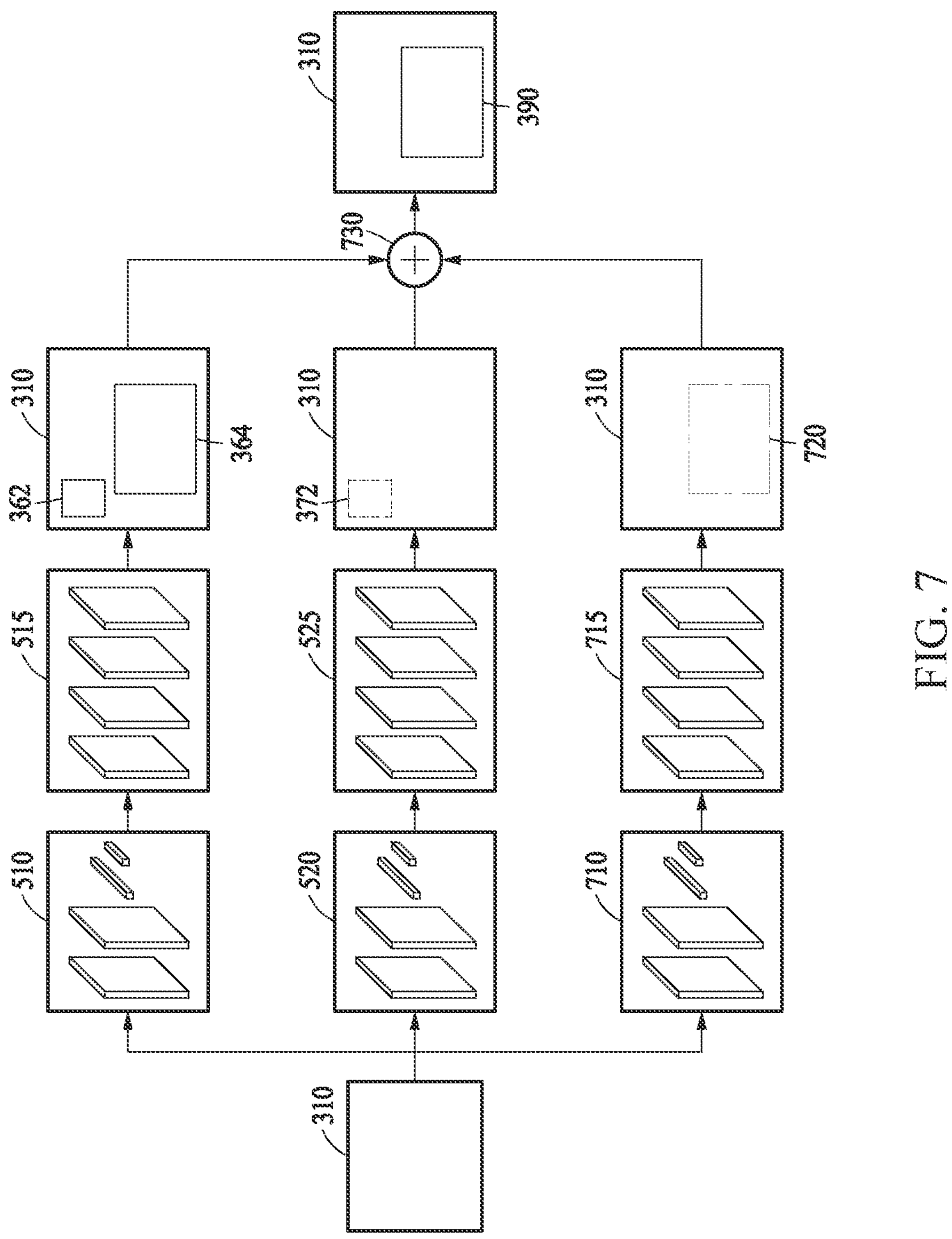
FIG. 7 illustrates an example of a structure for detecting a third object.

FIG. 7 illustrates an example of a structure for detecting a third object.

Referring to FIG. 7, a structure for detecting a third object may include the feature extractor 510, the object detection model 515, the feature extractor 520, and the error prediction model 525 included in the structure for detecting the second object illustrated in FIG. 5. However, the structure for detecting the third object may additionally include a feature extractor 710 and an error compensation model 715 connected to the feature extractor 710. The feature extractor 710 may extract feature data (e.g., a feature map) from the input image 310 and transmit the extracted feature data to the error compensation model 715. In an example, the feature extractor 710 may be integrated into the error compensation model 715, and the object detection model 520, the error prediction model 525, and the error compensation model 715 may share the same feature extractor.

A target candidate object 720 may be additionally detected from the input image 310 through the error compensation model 715. A value output from the error compensation model 715 may be represented as a vector value including information associated with a reference position and size (e.g., a width and a height) of a region corresponding to the target candidate object 720. The target candidate object 720 detected by the error compensation model 715 may overlap with the target candidate objects 362 and 364 detected by the object detection model 515. As illustrated in FIG. 7, the target candidate object 720 detected by the error compensation model 715 may include a part of the target candidate objects 362 and 364 detected by the object detection model 515 and only include the target candidate object 364 because the error compensation model 715 is trained to detect the target candidate object using a higher standard than the object detection model 515.

An object detection apparatus may perform a fusion 730 (or a combination) on results of detecting the target candidate objects 362 and 364 detected using the object detection model 515, a result of detecting the error object 372 detected using the error prediction model 525, and a result of detecting the target candidate object 720 detected using the error compensation model 715 to detect the target object 390 from the input image 310. A result value of the fusion 730 may be represented as the vector value including the reference position and size of the region corresponding to the target object 390, and information associated with an object class.

In the fusion 730 process, the object detection apparatus may determine a first weight based on a degree of overlap between the regions of each of the target candidate objects 362 and 364 detected using the object detection model 515 and the region of the error object 372 and a second weight based on a degree of overlap between regions of the target candidate object 720 detected using each of the target candidate objects 362 and 364 and the error compensation model 715, apply weights, and thus determine a final score. For example, the final score may be calculated as expressed by Equation 2 below.

$$S_{fin2}=S_{org2}\lambda_1\times\max(\mathrm{IOU}(b_{org2},b_{epm2}))+\lambda_2\times\max(\mathrm{IOU}(b_{org2},b_{esm2})) \quad (2)$$

In Equation 2, $S_{fin2}$ denotes a final score of a target candidate object, and $S_{org2}$ denotes an object score of the target candidate object determined by the object detection model 515, $\lambda_1$ and $\lambda_2$ denote constants, and $b_{epm2}$ denotes a bounding box of an error object. $b_{org2}$ denotes a bounding box of the target candidate object detected by the object detection model 515, and $b_{esm2}$ denotes a bounding box of a target candidate object detected by the error compensation model 715.

IOU( ) denotes an IOU function. The IOU function may determine a first weight based on a degree of overlap between the bounding box of the target candidate object and bounding boxes for each error object. Among first weights corresponding to the bounding boxes for each error object, a preset constant $\lambda_1$ may be multiplied to the greatest weight, which is then subtracted from an object score $S_{org2}$ of the target candidate object. In addition, the IOU function may determine a second weight based on a degree of overlap between the bounding box $b_{org2}$ of the target candidate object and the bounding box $b_{esm2}$ of the target candidate object. Among second weights corresponding to bounding boxes $b_{esm2}$ for each target candidate object, a preset constant $\lambda_2$ may be multiplied to the greatest weight, which is then added to the object score $S_{org2}$ of the target candidate object. Through this process, a final score $S_{fin2}$ for each target candidate object may be determined, and when the final score $S_{fin2}$ is equal to or greater than a threshold value, an object may be determined as a target object. When the final score $S_{fin2}$ is less than the threshold, the target candidate object may be excluded from being the target object. As illustrated in FIG. 7, the target candidate object 364 may be determined to be the target object 390 because the final score of the target candidate object 364 is equal to or greater than the threshold, and the target candidate object 362 may be excluded from being the target object because the final score determined by a first weight of the error object 372 is less than the threshold.

Figure 8:
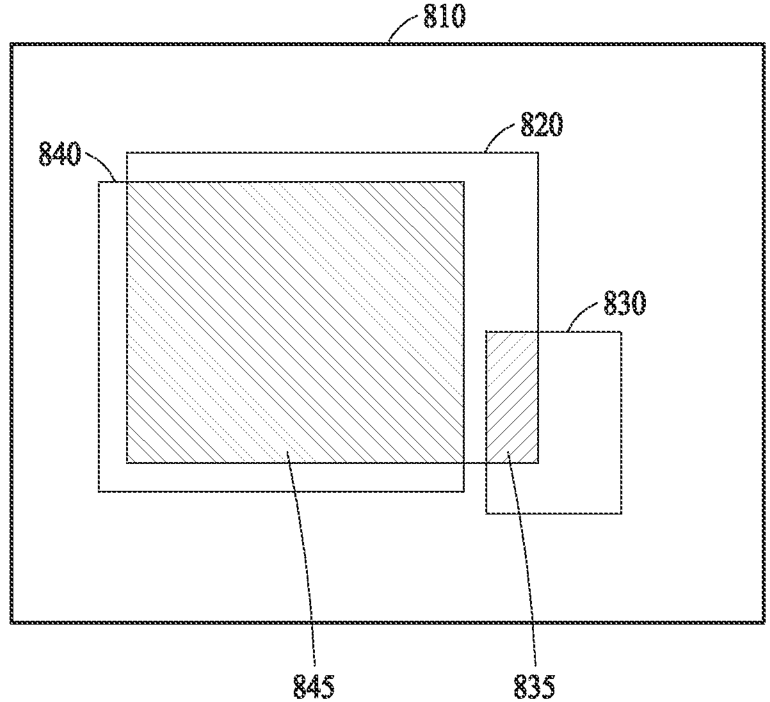
FIG. 8 illustrates an example of determining a weight based on a degree of overlap between regions.

FIG. 8 illustrates an example of determining a weight based on a degree of overlap between regions.

An example of a region of a target candidate object 820 detected by the object detection model 515 in a form of a bounding box in an input image 810, a region of an error object 830 detected by the error prediction model 525, and a region of a target candidate object 840 detected by the error compensation model 715 is illustrated in FIG. 8. The region of the target candidate object 820 and the region of the error object 830 may have an overlap region 835, and the region of the target candidate object 820 and the region of the target candidate object 840 may have an overlap region 845.

An object detection apparatus may determine a first weight based on a degree of overlap between the region of the target candidate object 820 and the region of the error object 830 using an IOU function. The first weight may be determined based on a value obtained by dividing an area of the overlap region 835 between the region of the target candidate object 820 and the region of the error object 830 by the area of a union region of the two regions. In addition, the object detection apparatus may determine a second weight based on a degree of overlap between the region of the target candidate object 820 and the region of the target candidate object 840 using the IOU function. The second weight may be determined based on a value obtained by dividing an area of the overlap region 845 between the region of the target candidate object 820 and the region of the target candidate object 840 by an area of the union region of the two regions. The object detection apparatus may determine a final score by subtracting the first weight from the object score of the target candidate object 820 and adding the second weight to the object score of the target candidate object 820, as described in Equation 2 above. As the IOU function value for the overlap region 835 increases, the first weight may increase, and the final score may decrease. As the value of the IOU function for the overlap region 845 may increase, the second weight may increase, and the final score may also increase.

Figure 9:
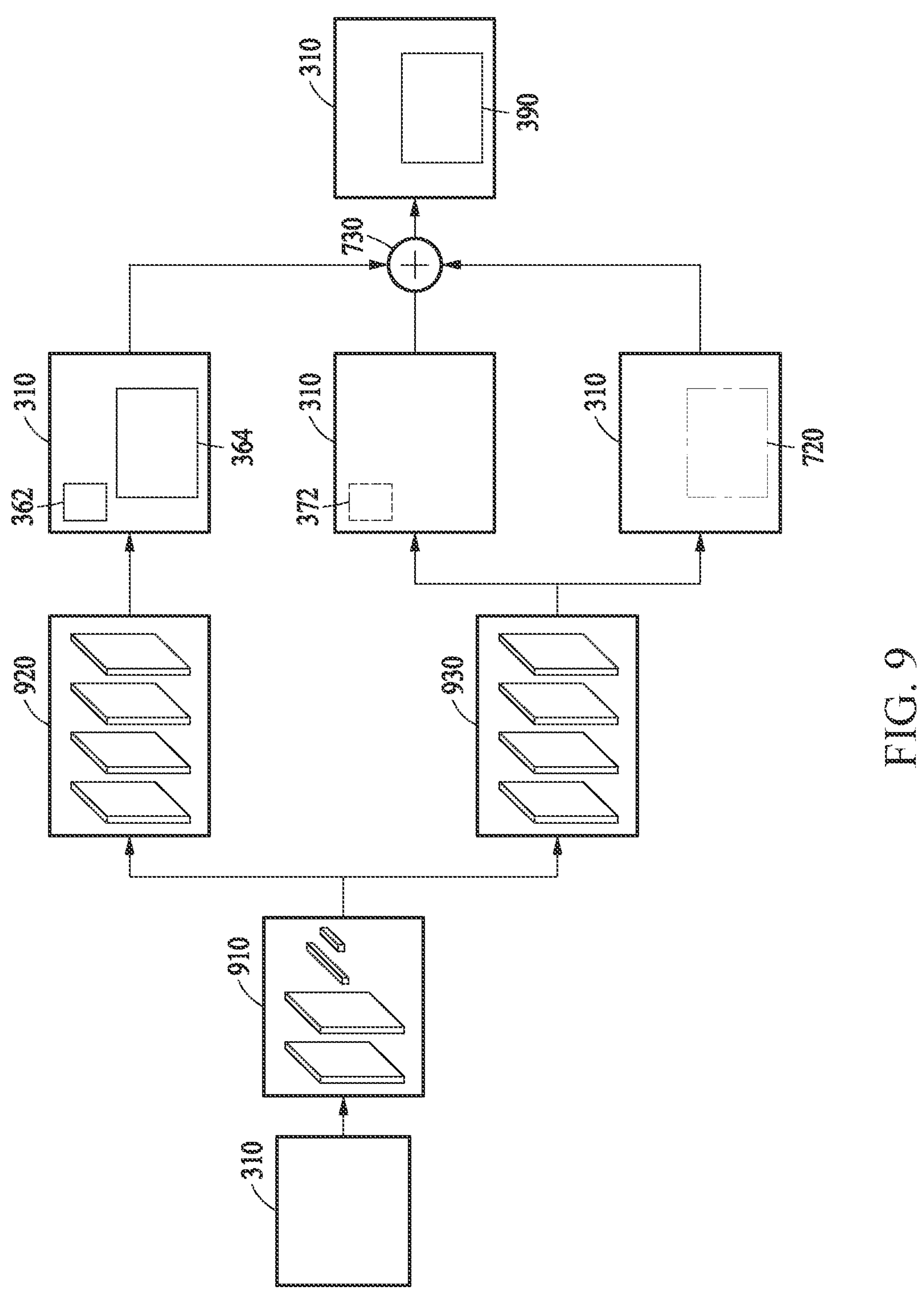
FIG. 9 illustrates an example of a structure for detecting a fourth object.

FIG. 9 illustrates an example of a structure for detecting a fourth object.

Referring to FIG. 9, a structure for detecting a fourth object may be partially modified from the structure for detecting the third object illustrated in FIG. 7. While the structure for detecting the third object may have separate feature extractors 510, 520, and 710 and a separate error compensation model 715, an object detection model 920 and an error prediction model 930 may have a feature extractor 910, and an error prediction model 930 may perform a function of the error prediction model 515 and a function of the error compensation model 715. The error prediction model 930 may output a result of detecting the error object 372 and an additional result of detecting the target candidate object 720 in the input image 310. When the error prediction model 930 is being trained, the error prediction model 930 may be trained to detect both classes of the error object and the target candidate object.

A process of detecting the target object 390 from the input image 310 by fusion 730 of the result of detecting the target candidate objects 362 and 364, the result of detecting the error object 372, and the additional result of detecting the target candidate object 720 may be the same as the process described with reference to FIG. 7. Thus, a more detailed description of the operations is not included here, for brevity.

Figure 10:
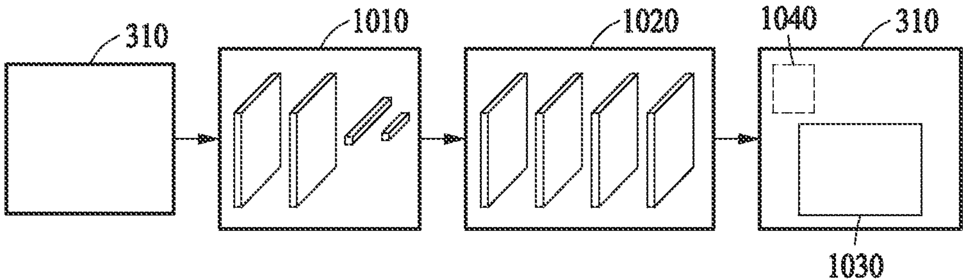
FIG. 10 illustrates an example of a structure for detecting a fifth object.

FIG. 10 illustrates an example of a structure for detecting a fifth object.

Referring to FIG. 10, a structure for detecting a fifth object may include a feature extractor 1010 that extracts feature data from the input image 310 and an object classification model 1020. The object classification model 1020 may classify objects in the input image 310 based on the feature data transmitted from the feature extractor 1010. The object classification model 1020 may be based on a neural network trained to classify objects in the input image 310 based on the feature data. The object classification model 1020 may detect a target object 1030 from the input image 310 and detect a background object 1040 that is not the target object 1030. A class of the target object 1030 to be detected by the object classification model 1020 may be a plurality of objects (e.g., a person, an image capturing apparatus, etc.), and remaining objects excluding the target object 1030 in the input image 310 may be all classified as background objects 1040.

Figure 11A:
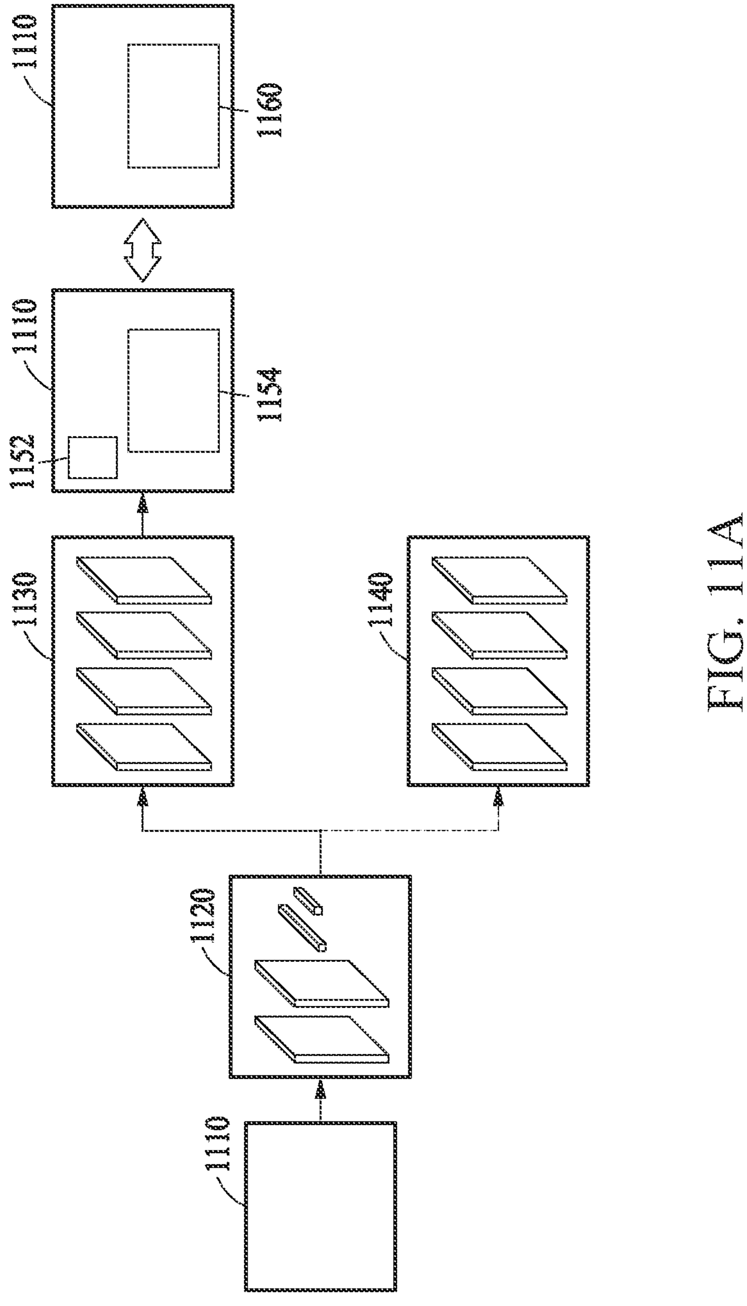
FIG. 11A illustrates an example of training an object detection model.
Figure 11B:
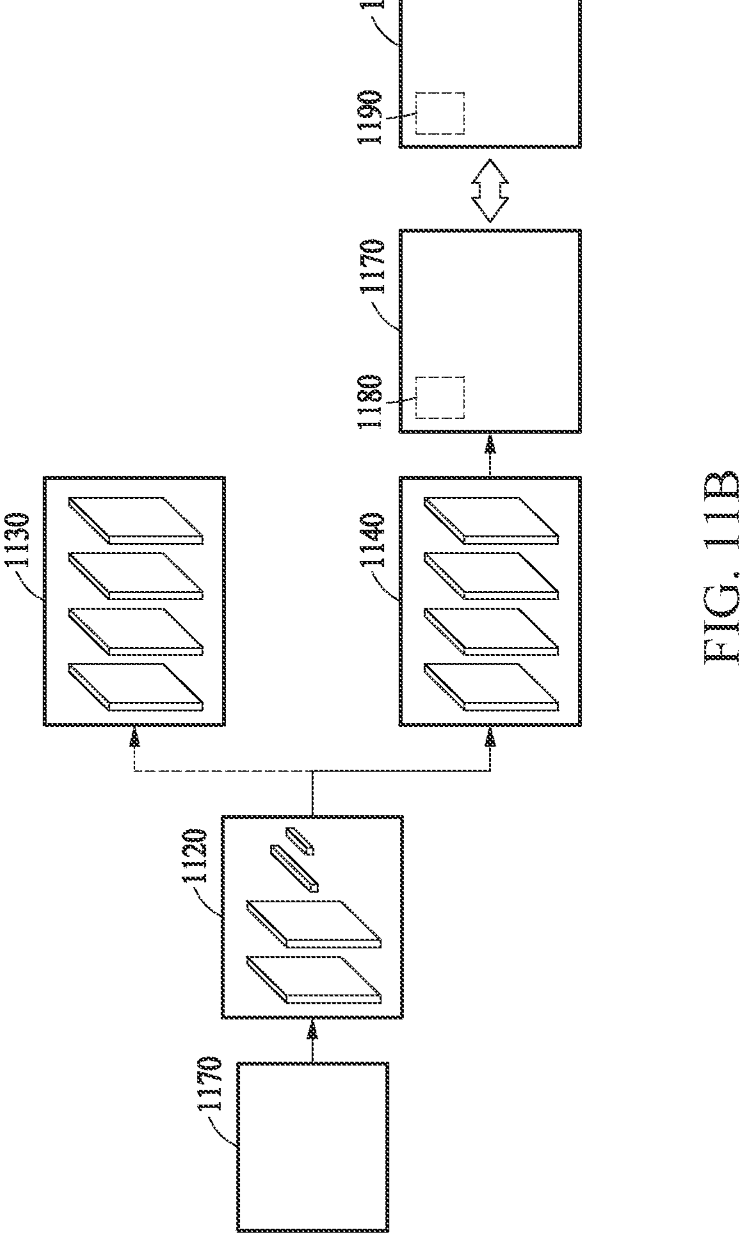
FIG. 11B illustrates an example of training an error prediction model.

FIGS. 11A and 11B illustrate examples of training an object detection model and an error prediction model.

Similar to the structure for detecting the first object illustrated in FIG. 3, an example of a feature extractor 1120 that extracts feature data from the trained image 1110 shared between an object detection model 1130 and an error prediction model 1140 is illustrated in FIGS. 11A and 11B. Since training is performed such that an object detection model 1130 and an error prediction model 1140 share a feature extractor 1120, a computation amount needed for training may be reduced. A training process may be divided into a first stage of training the feature extractor 1120 and the object detection model 1130 and a second stage of training the error prediction model 1140, and other training processes described hereinafter may be performed using a training apparatus.

FIG. 11A illustrates an example of a training process of the object detection model 1130. In the process of training the object detection model 1130, the error prediction model 1140 may not be trained. A training image 1110 may be input to the feature extractor 1120, and feature data of the training image 1110 extracted by the feature extractor 1120 may be transmitted to the object detection model 1130. Based on the feature data, the object detection model 1130 may detect target candidate objects 1152 and 1154 from the training image 1110. A training apparatus may calculate a difference between the target candidate objects 1152 and 1154 extracted by the object detection model 1130 and an actual target object 1160, which is a ground truth corresponding to the training image 1110, and parameters (e.g., a connection weight of a neural network) of the feature extractor 1120 and the object detection model 1130 may be updated such that the calculated difference decreases. As regions of the target candidate objects 1152 and 1154 detected by the object detection model 1130 become closer to a region of the actual target object 1160, the training apparatus may update the parameters of the feature classifier 1120 and the object detection model 1130 such that sets of information associated with an object class of the target candidate objects 1152 and 1154 (e.g., type of object class, object score) and information associated with the object class of the actual target object 1160 are similar.

FIG. 11B illustrates an example of training the error prediction model 1140. In a process of training the error prediction model 1140, the feature extractor 1120, and the object detection model 1130 may not be trained. In the process of training the object detection model 1130, a training image in which false detection of an object occurs by the object detection model 1130 may be used as a training image 1170 for training the error prediction model 1140.

Feature data may be extracted from the training image 1170 by the feature extractor 1120, and the extracted feature data may be transmitted to the error prediction model 1140. The error prediction model 1140 may provide a result of predicting whether an object 1180 detected in the training image 1170 corresponds to an error object 1190, obtain a loss (e.g., binary classification entropy (BCE) loss) based on the predicted result and the error object 1190 that is an actual ground truth of the trained image 1170, and update parameters (e.g., a connection weight of a neural network) of the error prediction model 1140 in a direction in which the loss may be reduced.

Since training images in which the object detection model 1130 incorrectly detects an object become training targets of the error prediction model 1140, the error prediction model 1140 trained to detect an error (or a mistake) of the object detection model 1130 in the training image may supplement performance of the object detection model 1130. While an object detection structure including the object detection model 1130 and the error prediction model 1140 may maintain its unique performance, that is, continue to detect an object well (as in previous cases), object detection accuracy may be improved by searching for an object that is incorrectly detected by the object detection model 1130 through a separate error prediction model 1140 and correcting a result of detecting an object by the object detection model 1130 based on the search.

Figure 12:
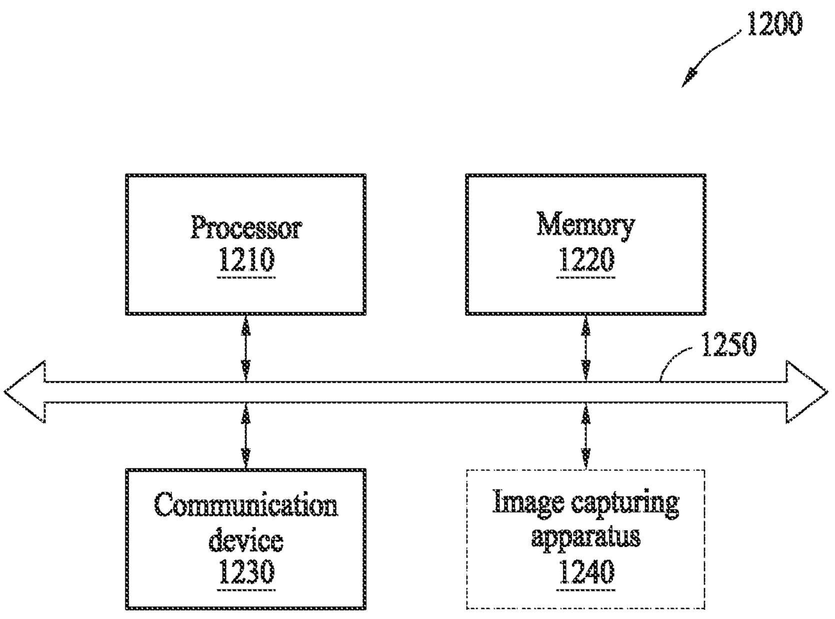
FIG. 12 illustrates an example of an object detection apparatus.

FIG. 12 illustrates an example of an object detection apparatus.

Referring to FIG. 12, an object detection apparatus 1200 may be a computing device that detects an object in an input image and may correspond to the object detection apparatus 100 illustrated in FIG. 1. The object detection apparatus 1200 may include a processor 1210, a memory 1220, and a communication apparatus 1230, and further include an image capturing apparatus 1240 based on an example. Each component of the object detection apparatus 1200 may communicate with one another through a communication bus 1250.

The processor 1210 may control overall operations of the object detection apparatus 1200 and execute functions and instructions to be executed in the object detection apparatus 1200. The processor 1210 may perform one or more of operations described with reference to FIGS. 1 to 10.

In an example, the processor 1210 may receive an input image and obtain a result of detecting a target candidate object from the input image using an object detection model. The result of detecting the target candidate object may include information associated with a region of the target candidate object detected in the input image and an object score corresponding to the target candidate object. The processor 1210 may obtain a result of detecting an error object from the input image using an error prediction model, and the result of detecting the error object may include information associated with a region of the error object detected in the input image. The processor 1210 may detect a target object from the input image based on the result of detecting the target candidate object and the result of detecting the error object. The processor 1210 may determine a final score of the target candidate object by applying, to an object score, a weight based on a degree of overlap between the region of the target candidate object and the region of the error object. The processor 1210 may detect the target object in the input image based on the determined final score. For example, when the final score of the target candidate object is equal to or greater than a threshold, the processor 1210 may select the target candidate object as the target object.

In another example, the processor 1210 may obtain an additional result of detecting the target candidate object from the input image using an error compensation model. The additional result of detecting the target candidate object may include information associated with the region of the target candidate object detected using the error compensation model. The processor 1210 may determine the final score of the target candidate object by applying, to the object score of the target candidate object, a first weight based on a degree of overlap between the region of the target candidate object detected using the object detection model and the region of the error object and a second weight based on a degree of overlap between the region of the target candidate object detected using the object detection model and the region of the target candidate object detected using the error compensation model. The processor 1210 may detect the target object in the input image based on the determined final score.

The memory 1220 may store information needed for the processor 1210 to perform a processing operation. For example, the memory 1220 may store instructions to be executed by the processor 1210, store related information while software and/or applications are executed by the object detection apparatus 1200. The memory 1220 may include a volatile memory such as a random-access memory (RAM), a dynamic random-access memory (DRAM), and/or a non-volatile memory known in the art such as a flash memory.

The communication device 1230 may communicate with an external device through a wired or wireless network. The input image may be transmitted to the object detection apparatus 1200 through the communication device 1230, or information associated with a result of detecting an object may be transmitted from the object detection apparatus 1200 to the external device.

The object detection apparatus 1200 may further include an image capturing apparatus 1240 such as a camera, and the image capturing apparatus 1240 may capture the input image that is used for detecting a target object. The image capturing apparatus 1240 may obtain a color image, a black and white image, a gray image, an infrared image, a depth image, and the like.

Figure 13:
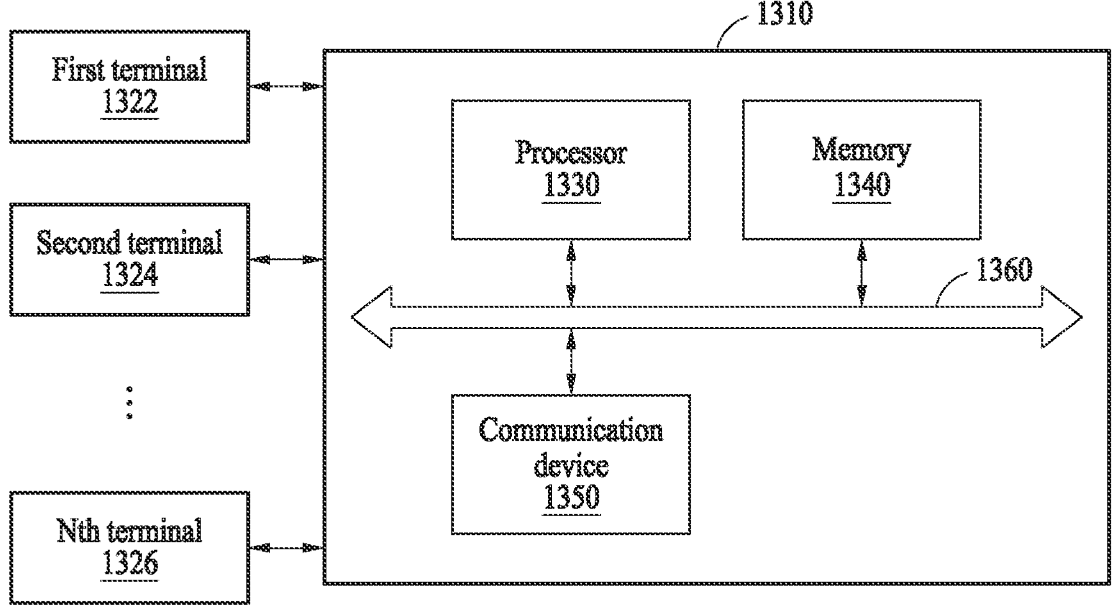
FIG. 13 illustrates an example of an image monitoring apparatus.

FIG. 13 illustrates an example of an image monitoring apparatus.

Referring to FIG. 13, an image monitoring apparatus 1310 may be monitor images transmitted from a plurality of terminals 1322, 1324, and 1326. The image monitoring apparatus 1310 may be used in a teleworking system and a video conferencing system that transmit images captured by teleworkers in real time. When the image monitoring apparatus 1310 is used in the teleworking system, the image monitoring apparatus 1310 may analyze an image transmitted from the terminals 1322, 1324, and 1326 of each teleworker to detect a security violation or a violation in telework regulations.

The image monitoring apparatus 1310 may perform a function of detecting an object in the image. The image monitoring apparatus 1310 may, for example, monitor whether a person or a preset object (e.g., an image capturing apparatus, etc.) is present as a target object in the image and determine whether the person detected in the image is an authenticated user. In addition, the image monitoring apparatus 1310 may determine whether a person is present in the image or determine the number of people in the image.

The image monitoring apparatus 1310 may include a processor 1330, a memory 1340, and a communication device 1350, and each component of the image monitoring apparatus 1310 may communicate with another through a communication bus 1360.

The communication device 1350 may receive the image from one or more of the terminals 1322, 1324, and 1326 through a wired network or a wireless network.

The processor 1330 may control an overall operation of the image monitoring apparatus 1310 and execute functions and instructions to be executed in the image monitoring apparatus 1310. The processor 1330 may detect an object from the images received from the terminals 1322, 1324, and 1326. The processor 1330 may perform operations of an object detection apparatus (e.g., the object detection apparatus 100 illustrated in FIG. 1 or the object detection apparatus 1200 illustrated in FIG. 12) described herein associated with detecting an object. For example, the processor 1330 may obtain a result of detecting a target candidate object, including information associated with a region of the target candidate object detected in the image using the object detection model and an object score corresponding to the target candidate object. The processor 1330 may obtain a result of detecting an error object from the image using an error prediction model, and the result of detecting the error object may include information associated with a region of the error object detected in the image. The processor 1330 may detect a target object from the image based on the result of detecting the target candidate object and the result of detecting the error object. The processor 1330 may determine a final score of the target candidate object by applying, to the object score, a weight based on a degree of overlap between the region of the target candidate object and the region of the error object. The processor 1330 may detect the target object in the image based on the determined final score. For example, when the final score of the target candidate object is equal to or greater than a threshold, the processor 1330 may select the target candidate object as the target object.

In another example, the processor 1330 may obtain an additional result of detecting the target candidate object from the image using an error compensation model. The additional result of detecting the target candidate object may include information associated with the region of the target candidate object detected using the error compensation model. The processor 1330 may determine the final score of the target candidate object by applying, to the object score of the target candidate object, a first weight based on a degree of overlap between the region of the target candidate object detected using the object detection model and the region of the error object and a second weight based on a degree of overlap between the region of the target candidate object detected using the object detection model and the region of the target candidate object detected using the error compensation model. The processor 1330 may detect the target object in the image based on the determined final score.

When a preset target object is detected as the target object detection result, the processor 1330 may execute a control operation corresponding to the preset target object. For example, when an electronic apparatus (e.g., a smartphone, a laptop computer, a webcam, a tablet computer, etc.) provided with an image capturing function is detected in the image transmitted from a first terminal 1322, the processor 1330 may determine a result of detecting the electronic apparatus as a security violation and block access to or perform a screen lock on the first terminal 1322.

In addition, the processor 1330 may detect a person (or a face) in the image transmitted from the first terminal 1322 and perform user authentication to verify whether the detected person is a registered person. The processor 1330 may extract a region including a human face from the image and extract facial features from the extracted face region. The processor 1330 may compare the extracted facial features and facial features of a pre-registered person to determine whether the person in the image is a registered person. When it is determined that the person in the image is not a registered person, or when more than the reference number of people is detected in the image, or when the person does not appear for a preset time period in an image sequence received in real time, the processor 1330 may block access to or perform the screen lock on the first terminal 1322.

The examples described herein may be implemented using hardware components, software components and/or combinations thereof. A processing device may be implemented using one or more general-purpose or special purpose computers, such as, for example, a processor, a controller, and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

Software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The above-described hardware devices may be configured to act as one or more software modules in order to perform the operations of the above-described examples, or vice versa.

The object detection apparatus, feature extractor, object detection model, error prediction model, fusion, image monitoring apparatus, processor, communication device, image capturing apparatus, and terminals, in FIGS. 1-13 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object detection method performed by an object detection apparatus, the method comprising:

obtaining, using an object detection model, a result of detecting a target candidate object from an input image;

obtaining, using an error prediction model, a result of detecting an error object from the input image; and detecting a target object in the input image based on the result of detecting the target candidate object and the result of detecting the error object, wherein the result of detecting the target candidate object comprises an object score corresponding to a target region of the target candidate object detected in the input image and the target candidate object, and wherein the result of detecting the error object comprises an error region of the error object detected in the input image, and the error region is spatially defined by a bounding box, wherein the detecting of the target object comprises:

determining a final score of the target candidate object by applying, to the object score, a weight determined based on an intersection-over-union (IOU) function between the target region of the target candidate object and the error region of the error object; and detecting the target object in the input image based on the final score, wherein the object detection method further comprises:

obtaining an additional result of detecting the target candidate object from the input image using an error compensation model, wherein the additional result comprises an error compensation target region of the target candidate object detected using the error compensation model, wherein the detecting of the target object comprises:

determining a final score of the target candidate object by applying, to the object score, a first weight determined based on a degree of overlap between the target region of the target candidate object detected using the object detection model and the error region of the error object and a second weight determined based on a degree of overlap between the target region of the target candidate object using the object detection model and the error compensation target region of the target candidate object detected using the error compensation model; and detecting the target object in the input image based on the final score, wherein the object detection model does not share a first extraction layers with the error prediction model or the error compensation model, the error prediction model and the error compensation model share a second feature extraction lavers.

2. The object detection method of claim 1, wherein the detecting of the target object comprises:

determining the target candidate object as the target object in response to the final score for the target candidate object being equal to or greater than a threshold.

3. The object detection method of claim 1, wherein the object detection model provides the result of detecting the target candidate object based on feature data extracted from the input image, and wherein the error prediction model provides the result of detecting the error object based on another feature data extracted from the input image.

4. The object detection method of claim 1, wherein the object detection model and the error prediction model are each based on a separate neural network.

5. The object detection method of claim 1, wherein the error prediction model outputs the result of detecting the error object and an additional result of the target candidate object, and wherein the detecting of the target object comprises detecting the target object in the input image based on the result of detecting the target candidate object, the result of detecting the error object, and the additional result of detecting the target candidate object.

6. The object detection method of claim 1, wherein the result of detecting the target candidate object comprises the result of detecting the target candidate object for a plurality of object classes, and wherein the plurality of object classes comprises a person and a capturing apparatus.

7. A non-transitory computer-readable storage medium storing instructions that, when executed by one or more processors, cause the one or more processors to perform the method of claim 1.

8. An object detection apparatus, comprising:

one or more processors are configured to:

obtain a result of detecting a target candidate object from an input image using an object detection model;

obtain a result of detecting an error object from the input image using an error prediction model; and detect a target object in the input image based on the result of detecting the target candidate object and the result of detecting the error object, wherein the result of detecting the target candidate object comprises an object score corresponding to a target region of the target candidate object detected in the input image and the target candidate object, wherein the result of detecting the error object comprises an error region of the error object detected in the input image, and the error region is spatially defined by a bounding box, and wherein the one or more processors are further configured to:

determine a final score of the target candidate object by applying, to the object score, a weight determined based on an intersection-over-union (IOU) function between the target region of the target candidate object and the error region of the error object; and detect the target object in the input image based on the final score, wherein the object detection method further comprises:

obtaining an additional result of detecting the target candidate object from the input image using an error compensation model, wherein the additional result comprises an error compensation target region of the target candidate object detected using the error compensation model, wherein the detecting of the target object comprises:

determining a final score of the target candidate object by applying, to the object score, a first weight determined based on a degree of overlap between the target region of the target candidate object detected using the object detection model and the error region of the error object and a second weight determined based on a degree of overlap between the target region of the target candidate object using the object detection model and the error compensation target region of the target candidate object detected using the error compensation model, and detecting the target object in the input image based on the final score, wherein the object detection model does not share a first extraction layers with the error prediction model or the error compensation model, the error prediction model and the error compensation model share a second feature extraction layers.

9. An image monitoring apparatus, comprising:

one or more processors configured to:

obtain a result of detecting a target candidate object from an image using an object detection model;

obtain a result of detecting an error object from the image using an error prediction model;

detect a target object from the input image based on the result of detecting the target candidate object and the result of detecting the error object; and execute an operation corresponding to a preset target object in response to the preset target object being detected as the result of detecting the target object, wherein the result of detecting the target candidate object comprises an object score corresponding to a target region of the target candidate object detected in the input image and the target candidate object, and wherein the result of detecting the error object comprises an error region of the error object detected in the input image, and the error region is spatially defined by a bounding box, and wherein the one or more processors are further configured to:

determine a final score of the target candidate object by applying, to the object score, a weight determined based on an intersection-over-union (IOU) function between the target region of the target candidate object and the error region of the error object; and detect the target object in the input image based on the final score, wherein the object detection method further comprises:

obtaining an additional result of detecting the target candidate object from the input image using an error compensation model, wherein the additional result comprises an error compensation target region of the target candidate object detected using the error compensation model, wherein the detecting of the target object comprises:

determining a final score of the target candidate object by applying, to the object score, a first weight determined based on a degree of overlap between the target region of the target candidate object detected using the object detection model and the error region of the error object and a second weight determined based on a degree of overlap between the target region of the target candidate object using the object detection model and the error compensation target region of the target candidate object detected using the error compensation model; and detecting the target object in the input image based on the final score, wherein the object detection model does not share a first extraction layers with the error prediction model or the error compensation model, the error prediction model and the error compensation model share a second feature extraction layers.

10. An object detection apparatus, comprising:

one or more processors are configured to:

extract feature data from an input image using a feature extractor;

detect a first target candidate object from the feature data using an object detection model;

detect an error object from the feature data using an error prediction model;

detect a second target candidate object from the feature data using an error compensation model; and detect a target object in the input image based on the first target candidate object, the error object, and the second target candidate object, wherein a result of detecting each target candidate object comprises a first object score corresponding to a target region of the first target candidate object detected in the input image, a second object score corresponding to a target region of the second target candidate object detected in the input image, the first target candidate object and the second target candidate object, wherein a result of detecting the error object comprises an error region of the error object detected in the input image, and the error region is spatially defined by a bounding box, and wherein the one or more processors are further configured to:

determine a first final score of the first target candidate object by applying, to the first object score, a weight determined based on an intersection-over-union (IOU) function between a first target region of the first target candidate object and the error region of the error object, determine a second final score of the second target candidate object by applying, to the second object score, a weight determined based on an intersection-over-union (IOU) function between a second target region of the second target candidate object and the error region of the error object, and detect the target object in the input image based on the first final score and the second final score, wherein the object detection method further comprises:

obtaining an additional result of detecting the target candidate object from the input image using an error compensation model, wherein the additional result comprises an error compensation target region of the target candidate object detected using the error compensation model, wherein the detecting of the target object comprises:

determining a final score of the target candidate object by applying, to the object score, a first weight determined based on a degree of overlap between the target region of the target candidate object detected using the object detection model and the error region of the error object and a second weight determined based on a degree of overlap between the target region of the target candidate object using the object detection model and the error compensation target region of the target candidate object detected using the error compensation model; and detecting the target object in the input image based on the final score, wherein the object detection model does not share a first extraction layers with the error prediction model or the error compensation model, the error prediction model and the error compensation model share a second feature extraction layers.

11. The object detection apparatus of claim 10, further comprising a memory configured to store instructions;

wherein the one or more processors are further configured to execute the instructions to configure the one or more processors to:

receive the input image;

extract the feature data from the input image using the feature extractor;

detect the first target candidate object from the feature data using the object detection model;

detect the error object from the feature data using the error prediction model;

detect the second target candidate object from the feature data using the error compensation model; and detect the target object in the input image based on the first target candidate object, the error object, and the second target candidate object.

12. The object detection apparatus of claim 10, wherein the feature extractor comprises a plurality of feature extractors, wherein a first feature extractor of the plurality of feature extractors provides the feature data of the first target candidate object, wherein a second feature extractor of the plurality of feature extractors provides the feature data of the error object, wherein a third feature extractor of the feature extractors provides the feature data of the second target candidate object.

13. The object detection method of claim 1, wherein the error prediction model is trained to detect an error caused by the object detection model by analyzing the result of detecting the target candidate object and configured to supplement the error by modifying the result of detecting the target candidate object.

14. The object detection method of claim 1, wherein the error prediction model is trained to detect an error caused by the object detection model by analyzing the result of detecting the target candidate object and configured to supplement the error by adjusting the final score of the target candidate object.

* * * * *